United States Patent
Suh et al.

(10) Patent No.: US 11,204,470 B2
(45) Date of Patent: Dec. 21, 2021

(54) WAVELENGTH SELECTIVE SWITCH FOR MULTIPLE UNITS

(71) Applicant: INLC TECHNOLOGY CO., LTD., Daejeon (KR)

(72) Inventors: Seong Woo Suh, Daejeon (KR); Seong Min Kang, Daejeon (KR); Tae Hwan Kim, Daejeon (KR)

(73) Assignee: INLC TECHNOLOGY CO., LTD., Daejeon (KR)

( * ) Notice: Subject to any disclaimer, the term of this patent is extended or adjusted under 35 U.S.C. 154(b) by 0 days.

(21) Appl. No.: 16/613,724

(22) PCT Filed: Jul. 19, 2017

(86) PCT No.: PCT/KR2017/007769
§ 371 (c)(1),
(2) Date: Nov. 14, 2019

(87) PCT Pub. No.: WO2019/004510
PCT Pub. Date: Jan. 3, 2019

(65) Prior Publication Data
US 2020/0073056 A1  Mar. 5, 2020

(30) Foreign Application Priority Data
Jun. 29, 2017 (KR) .................. 10-2017-0082492

(51) Int. Cl.
*G02B 6/35* (2006.01)
*H04Q 11/00* (2006.01)

(52) U.S. Cl.
CPC ......... *G02B 6/3502* (2013.01); *G02B 6/3544* (2013.01); *H04Q 11/0005* (2013.01); *H04Q 2011/0009* (2013.01)

(58) Field of Classification Search
CPC .................................................. G02B 6/3544
See application file for complete search history.

(56) References Cited

U.S. PATENT DOCUMENTS

| 8,190,025 | B2 | 5/2012 | Presley et al. ............... 398/48 |
| 9,588,299 | B2 * | 3/2017 | Mao ..................... G02B 6/3546 |
| 2002/0191899 | A1 * | 12/2002 | Kelly ................. H04J 14/0219 |
| | | | 385/24 |

FOREIGN PATENT DOCUMENTS

| JP | 2009-276747 A | 11/2009 |
| JP | 2011-065023 A | 3/2011 |

(Continued)

OTHER PUBLICATIONS

International Search Report dated Feb. 22, 2018, issued to the corresponding International Application No. PCT/KR2017/007769.

*Primary Examiner* — Omar R Rojas
(74) *Attorney, Agent, or Firm* — Stein IP, LLC (57) ABSTRACT

Disclosed is an invention related to a wavelength selective switch for multiple units. The wavelength selective switch for multiple units according to the present invention comprises: multiple input/output port groups comprising multiple input/output port arrays for transmitting multiple light beams comprising multiple wavelength channels, respectively; a switching lens portion configured such that light beams output from respective input/output ports intersect on a switching axis; a first prism portion arranged between the multiple input/output port arrays and the switching lens portion and configured such that respective light beams groups output from the multiple input/output port arrays refract at different angles on the switching axis; a second prism portion arranged after the switching lens portion and configured such that a center line of a light beam group output from the switching lens portion is arranged in parallel with an optical axis; a light expansion portion for expanding the beam size of a light beam output from the second prism portion in a dispersion axis direction; a light splitting portion for splitting the light beam, the beam size of which has been expanded by the light expansion portion, at a different angle (Continued)

on the dispersion axis according to the wavelength component; an image lens portion for readjusting and focusing wavelengths split by the light splitting portion; and a switching portion comprising divided surfaces corresponding to the multiple input/output port groups, the switching portion being configured to change the angle of a selected wavelength on the switching axis such that a wavelength channels of an input port selected independently with regard to each group is transmitted to an output port selected independently.

8 Claims, 10 Drawing Sheets

(56) References Cited

FOREIGN PATENT DOCUMENTS

| | | | |
|---|---|---|---|
| JP | 2012-220924 A | 11/2012 | |
| JP | 2015-141419 A | 8/2015 | |
| KR | 10-2016-0013850 A | 2/2016 | |
| WO | WO-2016071777 A2 * | 5/2016 | ............... G02F 1/31 |

* cited by examiner

WAVELENGTH SELECTIVE SWITCH FOR MULTIPLE UNITS

CROSS-REFERENCE TO RELATED APPLICATIONS

This application is a national stage of International Application No. PCT/KR2017/007769, filed Jul. 19, 2017, which claims the benefit of Korean Application No. 10-2017-0082492, filed Jun. 29, 2017, in the Korean Intellectual Property Office, the disclosures of which are incorporated herein by reference.

FIELD OF THE INVENTION

The present invention relates to a wavelength selective switch for multiple units, and more specifically, to a wavelength selective switch for multiple units using a pair of prisms that constitutes the multiple units without doubling the number of its components and reduces manufacturing processes.

DESCRIPTION OF THE RELATED ART

In general, a wavelength selective switch expands on a dispersion axis a light beam output from an input port and directs the beam into a diffraction grating. In the diffraction grating, the light beam is split into multiple wavelength components. The light beam whose wavelength components have been split in the diffraction grating enters a switching part. In the switching part, the light beam is set or directed at a predetermined angle according to a wavelength component to a corresponding output port array. A wavelength selective switch for multiple units is a wavelength selective switch that includes a wavelength selective switch for a plurality of subunits that operate independently. A wavelength selective switch for multiple units according to the related art uses multiple lenses each corresponding to a unit to arrange the multiple units in the single apparatus while suppressing the increase the size of the apparatus.

However, when the multiple lenses are assembled, the duration and processes can be increased. Moreover, an optical dead zone can take place in an area where the neighboring lenses are close to each other, to thereby increase, unnecessarily, the size of the wavelength selective switch.

The background technology of the present application is disclosed in the U.S. Pat. No. 8,190,025 (issued May 29, 2012, the title of the invention: wavelength selective switch having distinct planes of operation).

DETAILED DESCRIPTION OF THE INVENTION

Technical Subjects

The present invention is proposed to address the aforementioned problems. It is the purpose of the invention to provide a wavelength selective switch for multiple units which decreases the duration and processes of manufacturing and decreases its height yet maintaining the multiple units by eliminating an optical dead zone.

SUMMARY OF THE INVENTION

A wavelength selective switch (WSS) for multiple units according to an embodiment of the present invention includes: a plurality of input/output port groups including a plurality of input/output port arrays for transmitting a plurality of light beams each including a plurality of wavelength channels; a switching lens portion configured such that the plurality of light beams transmitted from the plurality of input/output port arrays intersect on a switching axis; a first prism portion arranged between the plurality of input/output port arrays and the switching lens portion, the first prism portion being configured to refract the plurality of light beams transmitted from the plurality of input/output port arrays at different angles on the switching axis according to different light beam groups; a second prism portion arranged after the switching lens portion, the second prism portion being configured to align a center line of each light beam group transmitted from the switching lens portion in parallel with an optical axis; a beam expansion portion configured for expanding a beam size of each light beam transmitted from the second prism portion in a direction of a dispersion axis; a beam splitting portion configured for splitting each light beam whose beam size has been expanded by the beam expansion portion at different angles on the dispersion axis according to different wavelength components; an imaging lens portion configured to readjust and focus the wavelengths of the light beams split by the beam splitting portion; and a switching portion including a plurality of divided areas corresponding to the plurality of input/output port groups, the switching portion being configured to change an angle of a beam with a selected wavelength on the switching axis such that the wavelength selected from the plurality of wavelength channels of an input port which is selected independently from each group is transmitted to an output port of the plurality of input/output port groups which is selected independently.

The WSS for multiple units according to the embodiment of the present invention may further includes: a polarization optical element configured to split the light beams with random polarizations transmitted from the plurality of input/output port arrays into two light beams with substantially the same polarization and arrange the two light beams on the dispersion axis.

In the WSS for multiple units according to the embodiment of the present invention, a part of the plurality of input/output groups may be arranged in an array.

In the WSS for multiple units according to the embodiment of the present invention, in the plurality of input/output port arrays, a different number of input/output ports may be assigned to each input/output port array.

In the WSS for multiple units according to the embodiment of the present invention, two of the plurality of input/output port arrays may be connected in series, one of the two input/output port arrays being used in attenuation mode while the other one of the two input/output port arrays being used in switching mode.

In the WSS for multiple units according to the embodiment of the present invention, one of the plurality of input/output port arrays may be connected to a photo detector to make an optical power monitor.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. Where a wavelength selective switch for multiple units is explained, the thickness of lines or the size of components as illustrated in the drawings may be exaggerated for the sake of the clarity and convenience of explanation. In addition, the terminologies as described below are the terminologies defined in consideration of the functions in the present invention, which can be varied according to the users, the intent of operators or the custom. Hence, these terminologies should be defined in light of the entire contents of the instant specification.

Figure 1:
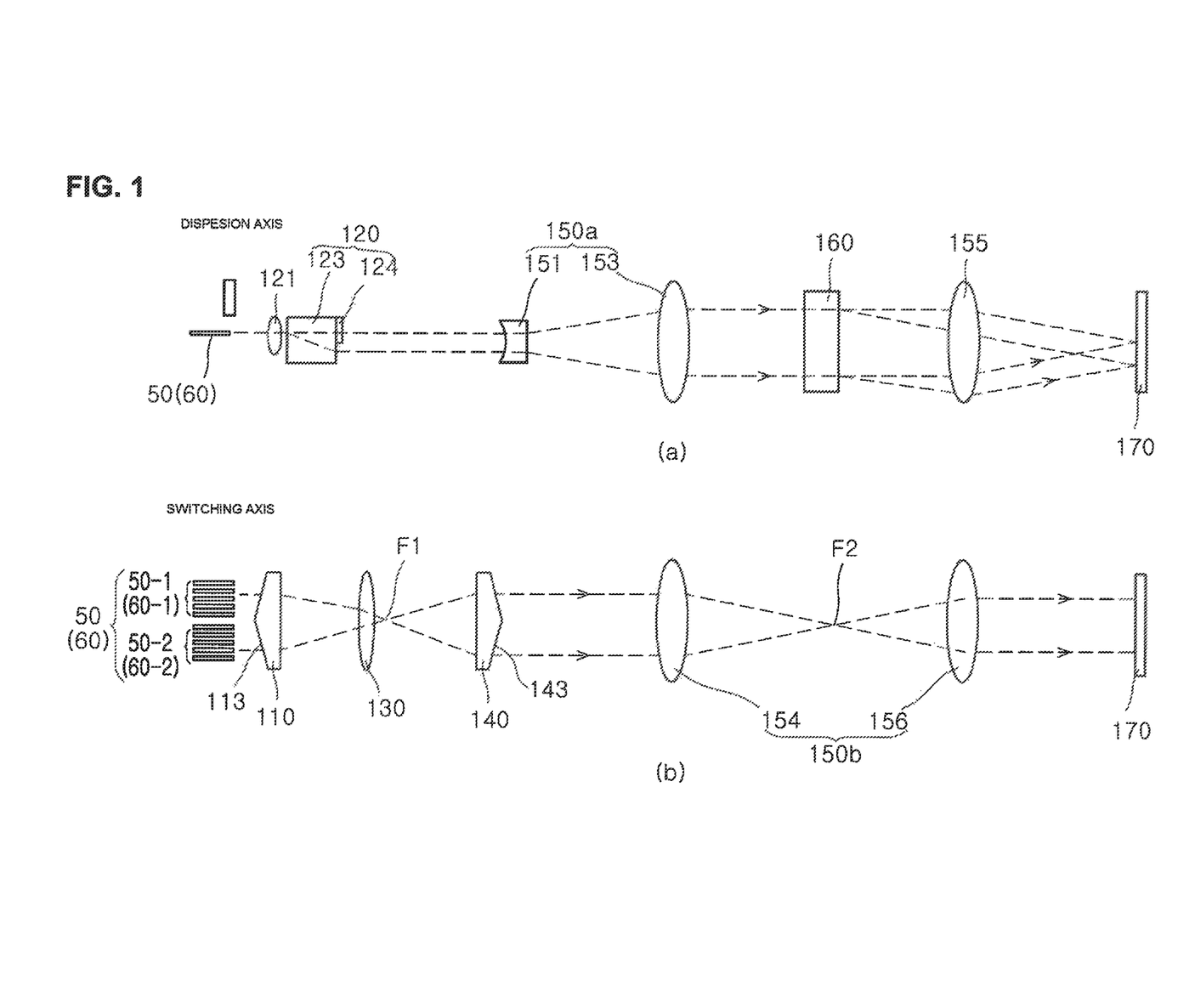
FIGS. 1(a)-1(b) schematically show a wavelength selective switch for multiple units in accordance with an embodiment of the present invention.
Figure 2:
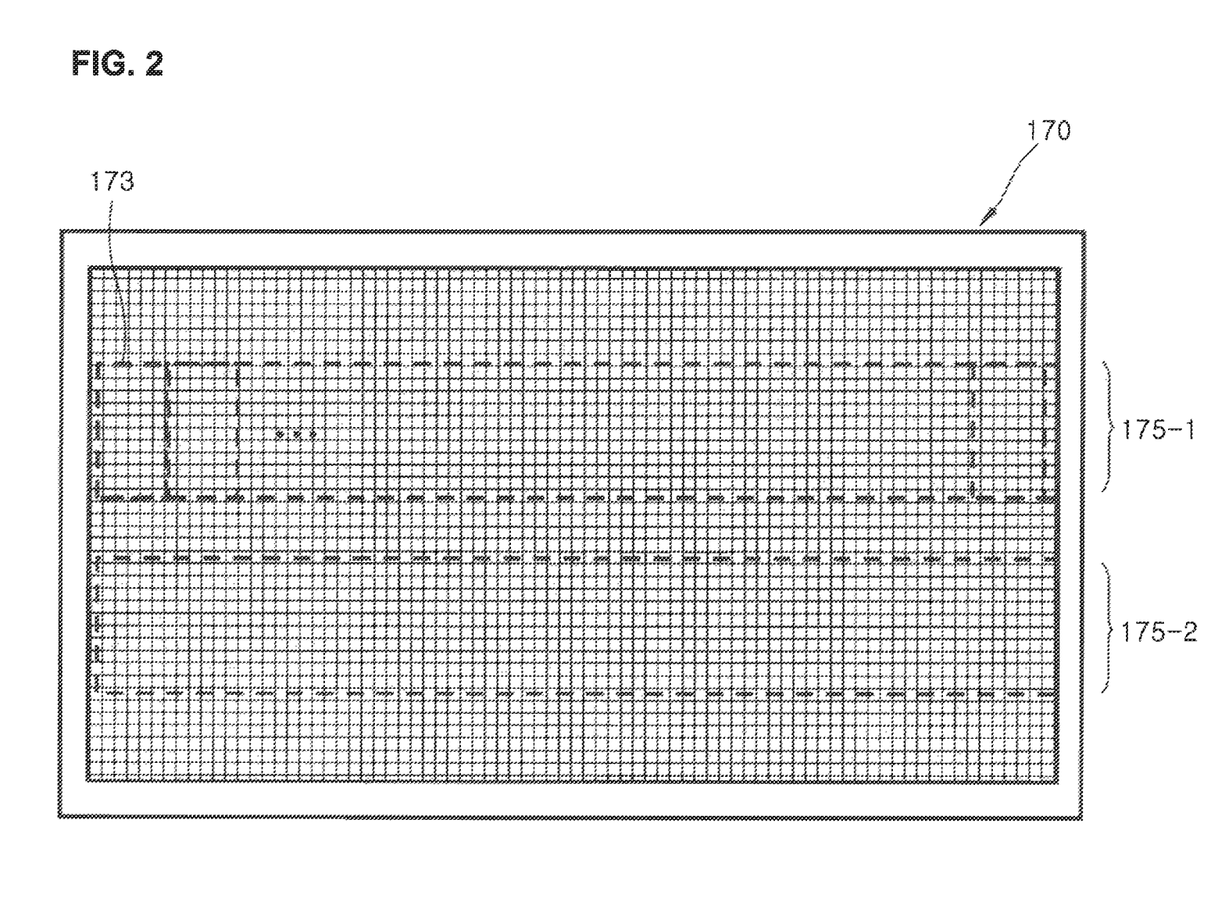
FIG. 2 schematically shows a switching portion of a wavelength selective switch for multiple units in accordance with an embodiment of the present invention.
Figure 3:
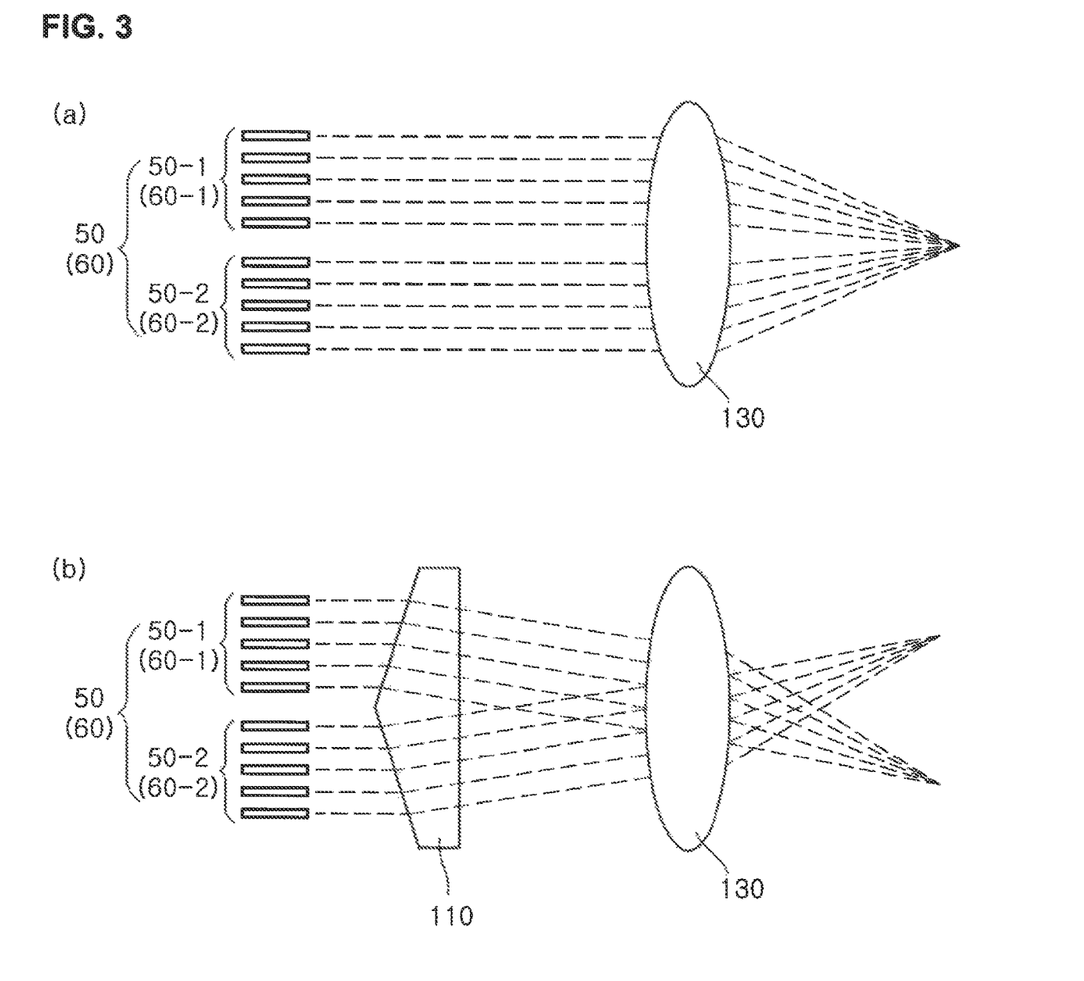
FIGS. 3(a)-3(b) illustrate the functions of a first prism portion in a wavelength selective switch for multiple units in accordance with an embodiment of the present invention.
Figure 4:
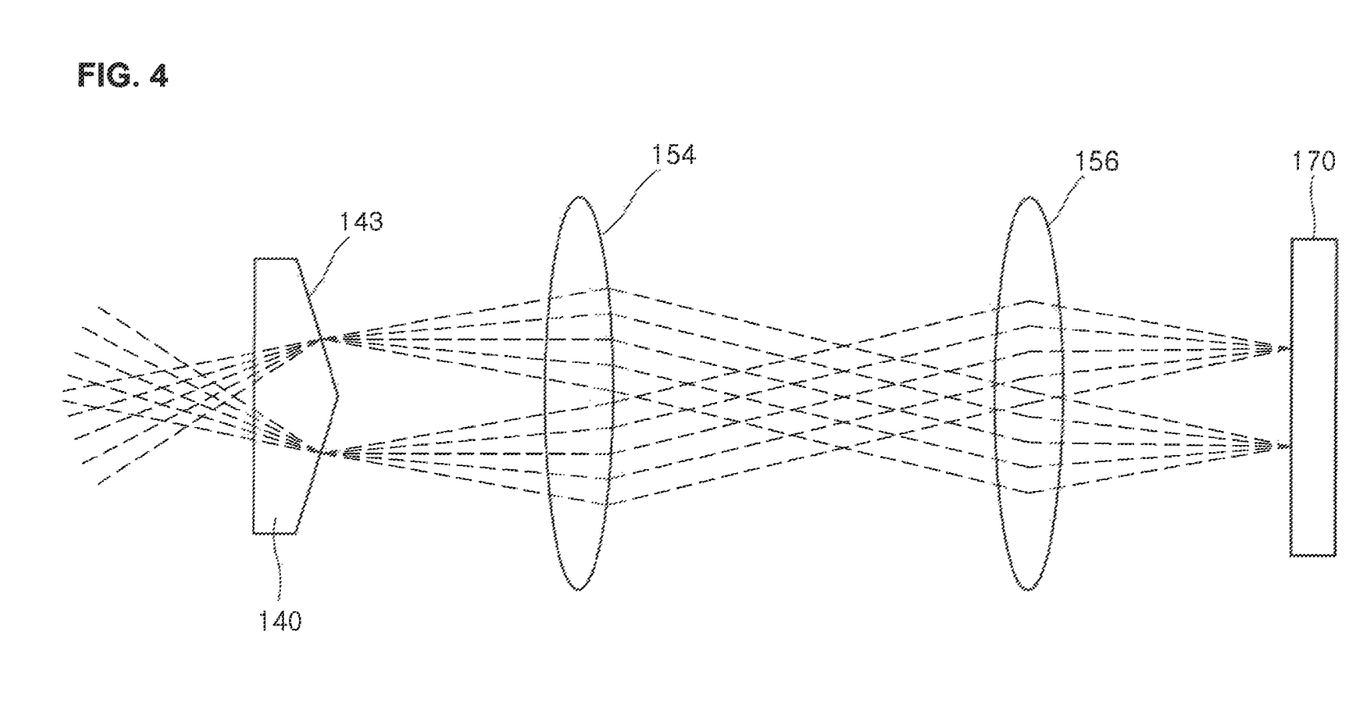
FIG. 4 illustrates the functions of a second prism portion and the state in which the intersections of input/output port groups are relayed at a second relay lens portion in a wavelength selective switch for multiple units in accordance with an embodiment of the present invention.
Figure 5:
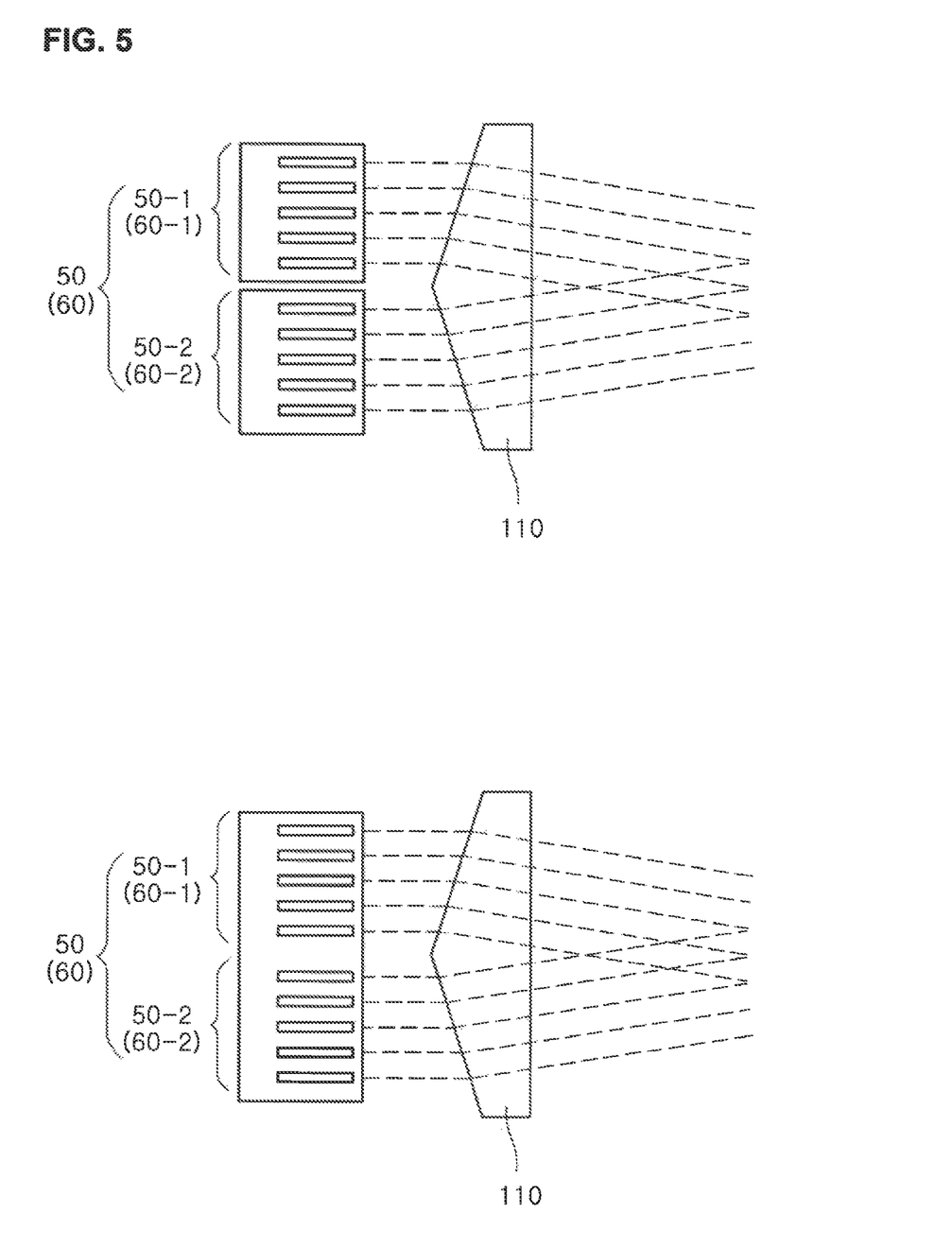
FIG. 5 schematically shows input/output port groups in a wavelength selective switch for multiple units in accordance with an embodiment of the present invention.
Figure 6:
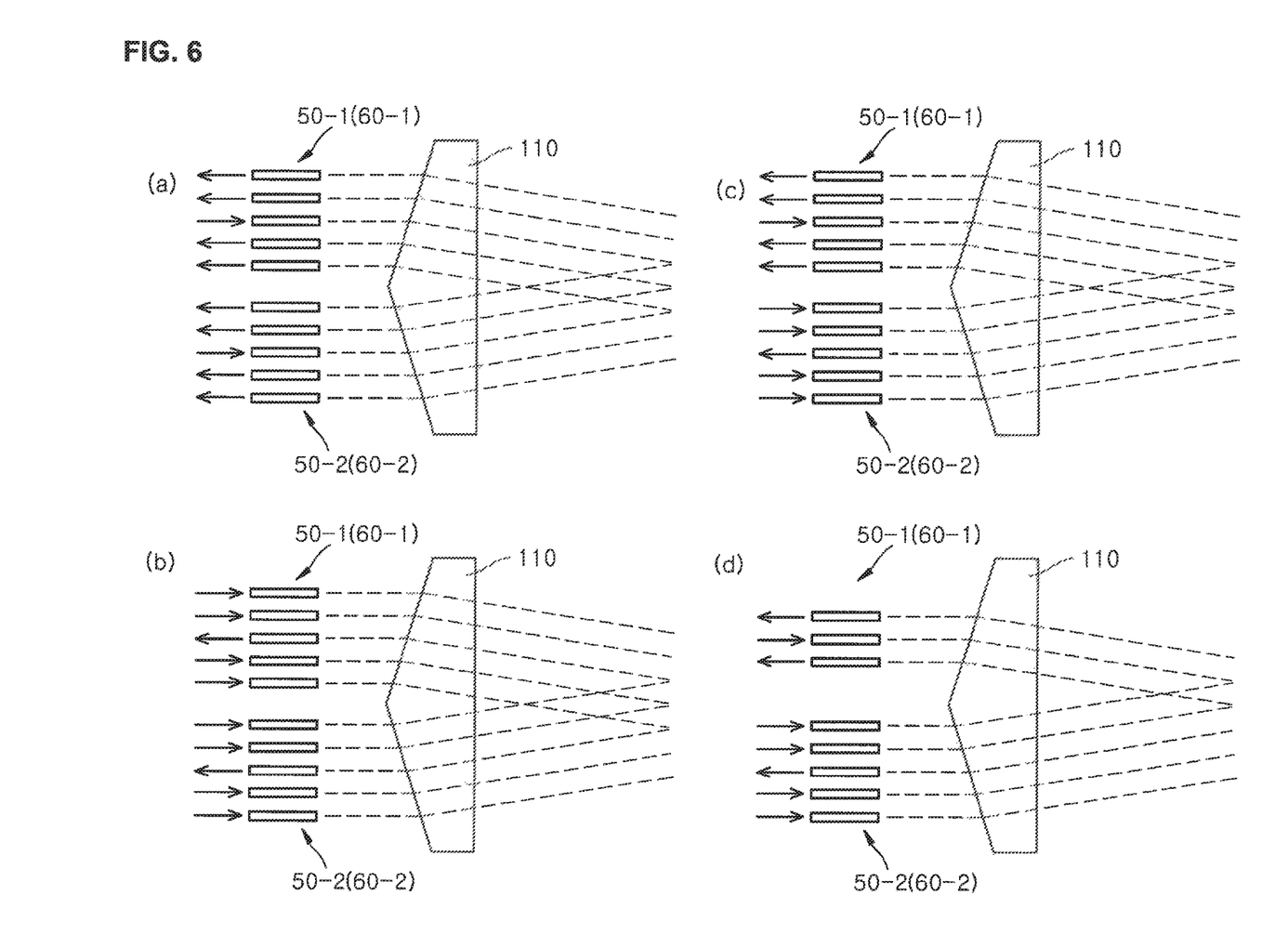
FIGS. 6(a)-6(d) schematically show the constitution of input/output ports of each input/output port group in a wavelength selective switch for multiple units in accordance with an embodiment of the present invention.
Figure 7:
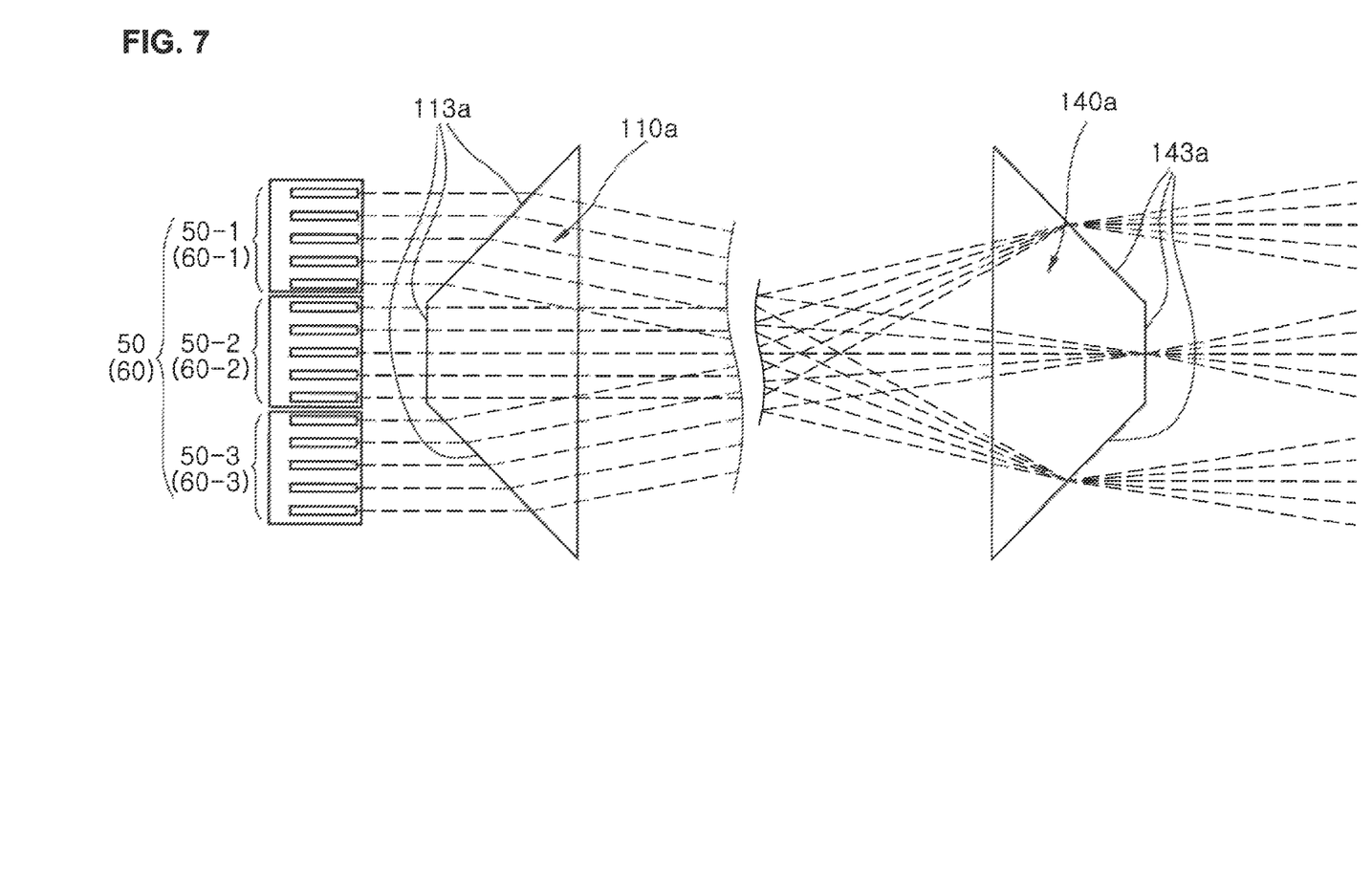
FIG. 7 schematically shows three input/output port groups and first and second prism portions corresponding thereto in a wavelength selective switch for multiple units in accordance with an embodiment of the present invention.
Figure 8:
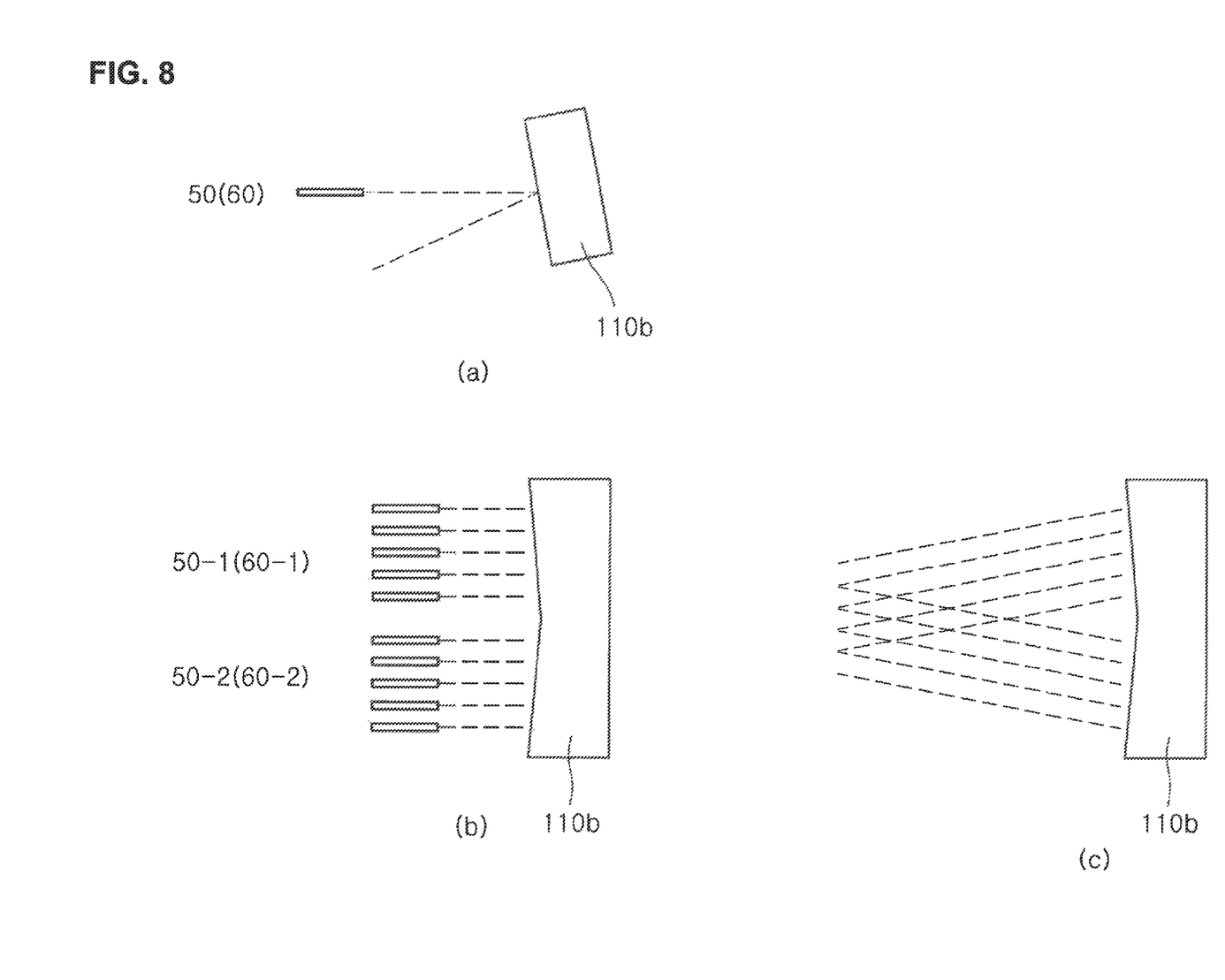
FIGS. 8(a)-8(c) schematically show various forms of a first prism portion in a wavelength selective switch for multiple units in accordance with an embodiment of the present invention.
Figure 9:
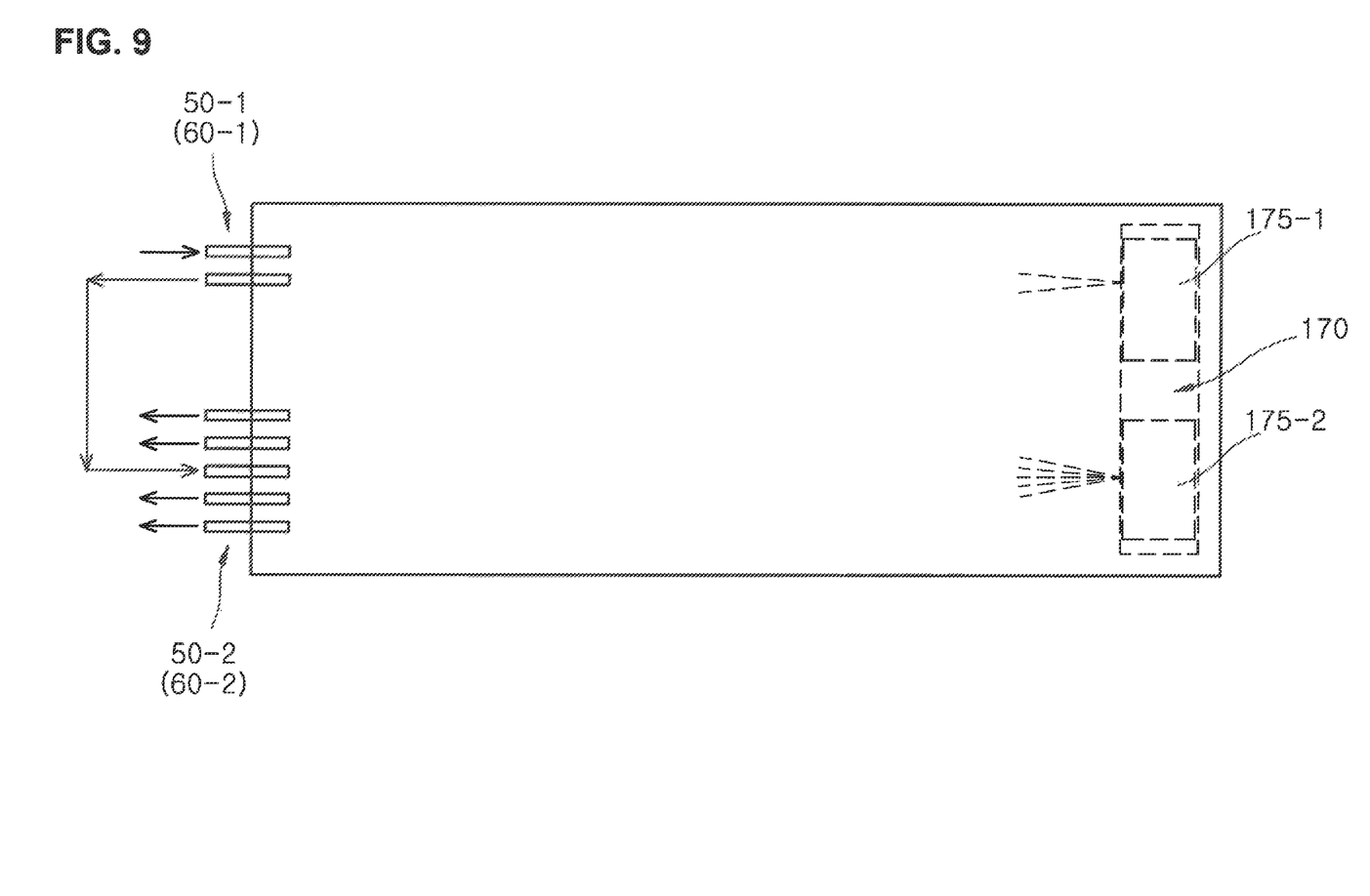
FIG. 9 schematically shows two input/output port groups connected in series which function as an attenuation mode or switching mode in a wavelength selective switch for multiple units in accordance with an embodiment of the present invention.

FIG. 1 schematically shows a wavelength selective switch for multiple units in accordance with an embodiment of the present invention; FIG. 2 schematically shows a switching portion of a wavelength selective switch for multiple units in accordance with an embodiment of the present invention; FIG. 3 illustrates the functions of a first prism portion in a wavelength selective switch for multiple units in accordance with an embodiment of the present invention; FIG. 4 illustrates the functions of a second prism portion and the state in which the intersections of input/output port groups are relayed at a second relay lens portion in a wavelength selective switch for multiple units in accordance with an embodiment of the present invention; FIG. 5 schematically shows input/output port groups in a wavelength selective switch for multiple units in accordance with an embodiment of the present invention; FIG. 6 schematically shows the constitution of input/output ports of each input/output port group in a wavelength selective switch for multiple units in accordance with an embodiment of the present invention; FIG. 7 schematically shows three input/output port groups and first and second prism portions corresponding thereto in a wavelength selective switch for multiple units in accordance with an embodiment of the present invention; FIG. 8 schematically shows various forms of a first prism portion in a wavelength selective switch for multiple units in accordance with an embodiment of the present invention; and FIG. 9 schematically shows two input/output port groups connected in series which function as an attenuation mode or switching mode in a wavelength selective switch for multiple units in accordance with an embodiment of the present invention.

Referring to FIG. 1, a wavelength selective switch for multiple units in accordance with an embodiment of the present invention includes input/output port parts (50, 60), a polarization optical element (120), a switching lens portion (130), a first prism portion (110), a second prism portion (140), a beam expansion portion (150a), a relay lens portion (150b), a beam splitting portion (160), and an imaging lens portion (155).

The wavelength selective switch for multiple units disperses, diffracts, focuses and angular changes a light beam with respect to a dispersion axis and a switching axis. The dispersion axis can be arranged orthogonal to or not orthogonal to the switching axis.

The input/output port parts (50, 60) includes a plurality of input/output port array groups (50-1, 60-1, 50-2, 60-2) comprised of a plurality of input/output port arrays. For the sake of convenience in explanations, only a first input/output port group (50-1, (60-1)) and a second input/output port group (50-2, (60-2)) are illustrated in the drawing, and while only 5 ports are assigned to each input/output group (50-1, 60-1, 50-2, 60-2) in the drawing, a different number of the ports can be assigned in a different embodiment.

The wavelength selective switch may include a collimation lens (121). The collimation lens (121) is arranged between the input/output port parts (50, 60) and a switching lens portion (130), and collimates an expanded light beam emitted from the input/output port parts (50, 60) on the dispersion axis, Here, the collimation means controlling the direction of the light beam which has been expanded at a certain degree to be in parallel to an optical path. The light beam that has passed through the collimation lens (121) is transmitted to a polarization optical element (120).

Between the switching lens portion (130) and the input/output port parts (50, 60) is provided the polarization optical element (120). The polarization optical element (120) separates the light beam transmitted from the input/output port parts (50, 60) into two light beams each having the same polarization state, and arranges the two light beams on the dispersion axis.

The polarization optical element (120) includes a birefringent crystal (123) and a half-wave plate (124). The light beam passing through the birefringent crystal (123) is split into a light beam with a polarization in parallel with the dispersion axis and a light beam with a polarization in parallel with the switching axis. The light beam with the polarization in parallel with the switching axis is changed to a light beam with the polarization in parallel with the dispersion axis as it passes through the half-wave plate (124). The two light beams with the polarizations as separated above are arranged on the dispersion axis.

The first prism portion (110) is located between the plurality of input/output port groups (50-1, 60-1, 50-2, 60-2) and the switching lens portion (130). The first prism portion (110) refracts the light beam groups output from the plurality of input/output port groups (50-1, 60-1, 50-2, 60-2) at different angles according to each group on the switching axis.

The first prism portion (110) includes a plurality of first incident surfaces (113), opposite to the plurality of input/output port groups (50-1, 60-1, 50-2, 60-2), which refracts the plurality of light beam groups output from the plurality of input/output port groups (50-1, 60-1, 50-2, 60-2) at different angles according to each group on the switching axis. The first incident surfaces (113) can be formed as many as the number of the input/output port groups (50-1, 60-1, 50-2, 60-2).

Further, the first incident surfaces (113) can be formed on the proximal side of the first prism portion (110) with respect to the input/output port parts (50, 60), or on the distal side thereof. While FIG. 1 shows a structure in which the two input/output port groups (50-1, 60-1, 50-2, 60-2) face the first prism portion (110), it is possible to arrange three or more input/output port groups (50-1, 60-1, 50-2, 60-2, 50-3, 60-3) to face the first prism portion (110a) as shown in FIG. 7. Further, the first incident surfaces (113a) can be formed on the first prism portion (110a) as many as the number of the input/output port groups (50-1, 60-1, 50-2, 60-2).

The switching lens portion (130) crosses the light beams output from the polarization optical element (120) on the switching axis.

The switching lens portion (130) may be a cylindrical lens having a curve on the switching axis. Since the switching lens portion (130) is formed to have a curve on the switching axis, the light beams can be crossed on the switching axis. Further, the focal length of the switching lens portion (130) can be adjusted by adjusting the curve of the switching lens portion (130). Here, since the input/output port groups (50-1, 60-1, 50-2, 60-2) have different angles by the first prism portion (110), the intersections of each input/output port group (50-1, 60-1, 50-2, 60-2) are separated on the switching axis as shown in FIG. 3. Here, the cylindrical lens is a lens in which a flat surface is formed on one side and a curved surface on the other side.

The switching lens portion (130) can be located after the polarization optical element (120) while the collimation lens (121) can be located between the polarization optical element (120) and the input/output port arrays (50, 60), Alternatively, both the switching lens portion (130) and the collimation lens (121) can be located between the polarization optical element (120) and the input/output port groups (50-1, 60-1, 50-2, 60-2).

The second prism portion (140) is located between the switching lens portion (130) and the relay lens portion (150b). The second prism portion (140) is configured to align a center line of the light beam groups output from the switching lens portion (130) in parallel on the optical axis. Hence, the plurality of light beam groups are transmitted in a state where superposition of the light beam groups is avoided by separating them into groups.

The second prism portion (140) includes a plurality of second incident surfaces (143) configured to align the center line of the plurality of light beam groups output from the switching lens portion (130) in parallel on the optical axis. Further, the second incident surfaces (143) can be formed on a proximal side of the second prism portion (140) with respect to the input/output port groups (50-1, 60-1, 50-2, 60-2), or on a distal side thereof. Referring to FIG. 1 or FIG. 7, the second incident surfaces (143a) can be formed as many as the number of the light beam groups (i.e., the number of the input/output port groups (50-1, 60-1, 50-2, 60-2, 50-3, 60-3)).

Meanwhile, in case the lenses are installed in such a way to make a one-to-one correspondence with the plurality of input/output port groups (50-1, 60-1, 50-2, 60-2), it is likely to take place assembly deviations of lenses and losses due to the assembly deviations of lenses. Moreover, an optical dead zone can take place in an area where the neighboring lenses are close to each other (the circumferential areas of the lenses). In contrast, in accordance with an embodiment of the present invention, since the first prism portion (110) and the second prism portion (140) face the plurality of input/output port groups (50-1, 60-1, 50-2, 60-2) to separate the plurality of groups, it is possible to avoid changes in the focusing length of the light beams even if assembly deviations of the first prism portion (110) and the second prism portion (140) take place. Further, it is possible to prevent an optical dead zone taking place at the first prism portion (110) and the second prism portion (140). Further, since the first prism portion (110) and the second prism portion (140) completely separate the optical paths of the plurality of light beam groups, it is possible to keep the light beam groups from entering the ports of different input/output port array groups (50-1, 60-1, 50-2, 60-2).

The beam expansion portion (150a) expands the beam size of the light beam output from the second prism portion (140).

The beam expansion portion (150a) includes a first beam expansion lens (151) and a second beam expansion lens (153) configured to expand the beam size of the light beam in a direction of the dispersion axis.

The beam expansion portion (150a) can be constituted of a pair of lenses having different focal lengths, and increase the beam size by expanding the light beam in a direction of the dispersion axis in a telescopic manner. The beam expansion portion (150a) includes at least one cylindrical lens having a curve on the dispersion axis. Here, the beam size of the light beam is expanded in a direction of the dispersion axis while not being expanded in a direction of the switching axis. Here, the telescopic manner means an arrangement where two lenses are arranged with a distance as close as the focal length.

The beam splitting portion (160) is configured to split the light beam whose beam size has been expanded by the beam expansion portion (150a) at different angles on the dispersion axis according to the wavelength components. The beam splitting portion (160) includes a prism part (not shown) and a grating part (not shown). Here, the prism part and the grating part can be formed integrally or separately.

The imaging lens portion (155) is configured to rearrange and focus the wavelength components which have been split by the beam splitting portion (160). The imaging lens portion (155) can be constituted of a pair or more of lenses.

On the switching axis, between the second prism portion (140) and the switching portion (170) is located the relay lens portion (150b). The relay lens portion (150b) includes a first relay lens (154) and a second relay lens (156). By arranging the lens portion, the second beam expansion lens (153) can function as the first relay lens (154) while the imaging lens (155) as the second relay lens (156). Here, the relay means transmission of the optical characteristics such as the beam size of the light beam, the size of the beam and the beam propagation direction, as they are.

The switching portion (170) is configured to make an angular displacement on the angles of the selected wavelengths to transmit the wavelengths selected by the plurality of wavelength channels to the independently selected output ports. The switching portion (170) includes a plurality of switching channel portions (173: see FIG. 2) configured to reflect the light beam output from the imaging lens portion (155) according to the wavelengths. Referring to FIG. 2, the switching portion (170) includes multiple pixels, of which some pixel group is used as a corresponding portion to each input/output port array group (50-1, 60-1, 50-2, 60-2), of which each corresponding portion is used as the switching channel portion (173) corresponding to each wavelength. The switching portion (170) can be constituted of LCoS (liquid crystal on silicon) and makes an angular displacement on the angle of a certain wavelength by generating a phase ramp on the switching axis according to the input electrical signal.

The larger the beam size of the light beam entering the imaging lens portion (155) gets, the smaller the beam spot size of the light beam focused on the switching portion (170) can be. Here, as the beam spot size of the light beam gets smaller in a direction of the dispersion axis, the neighboring beam spots can be kept from being overlapped in the switching channel portions (172) of the switching portion (170). The light beam irradiated from the first input/output port array groups (50-1, 60-1) enters a first correspondence portion (175-1: see FIG. 2), and the light beam irradiated from the second input/output port array groups (50-2, 60-2) enters a second correspondence portion (175-2).

The plurality of wavelength channels which have been independently angular displaced at the switching portion (170) are output to corresponding output port arrays through the same path as the path along which the light beam is input. In other words, the plurality of wavelength channels which have been angular displaced at the switching portion (170) are output to the output port arrays via the imaging lens portion (155), the relay lens portion (150b), the beam splitting portion (160), the beam expansion portion (150a), the second prism portion (140), the polarization optical element (120), the collimation lens (121), and the first prism lens portion (110), in this order.

In a wavelength selective switch for multiple units according to an embodiment of the present invention, the constitution corresponding to one wavelength selective switch can be considered as an optical system which one input/output array group (50-1, 60-1, 50-2, 60-2) and a surface of a switching portion (170) corresponding thereto, and all the input/output port array groups (50-1, 60-1, 50-2, 60-2) share.

Referring to FIG. 5, different input/output port groups (50-1, 60-1, 50-2, 60-2) can be arranged in the same array, or can be constituted as a plurality of arrays placed independently.

Referring to FIG. 6, in a plurality of input/output port parts (50, 60) are placed input/output port array groups (50-1, 60-1, 50-2, 60-2) in which the number of input/output ports are the same or different per group. In FIG. 6(a), one input port and N output ports are assigned to each group. In FIG. 6(b), N input ports and one output port are assigned to each group. In FIG. 6(c), one input port and N output ports are assigned to one group while N input ports and one output port are assigned to the other group. In FIG. 6(d), one input port and M output ports are assigned to one group while N input ports and one output port are assigned to the other group, where M, N are different integers which are equal to or more than one. Besides the embodiments shown in FIG. 6, it is possible to be constituted of a combination of various numbers of input and/or output ports.

Referring to FIG. 8, the first prism portion (110b) can be constituted using a reflective prism. FIG. 8(a) illustrates the path of the beam incident to and reflection from the first prism portion (110b) on the dispersion axis; FIG. 8(b) illustrates the paths of the beams incident to the first prism portion (110b) on the switching axis; and FIG. 8(c) illustrates the paths of the beams reflected from the first prism portion (110b) on the switching axis. In a similar manner, the second prism portion (140) can be constituted using a second prism (not shown).

Referring to FIG. 9, two input/output port array groups (50-1, 60-1, 50-2, 60-2) are connected in series, wherein one input/output port array group (50-1, 60-1) can be used in an attenuation mode while the other input/output port array group (50-2, 60-2) can be used in a switching mode. The input/output port array group (50-1, 60-1, 50-2, 60-2) in the attenuation mode has an input port and an output port, and independently attenuates or blocks the optical power of a plurality of wavelength components output according to the operation of the corresponding switching portion (175-1). The output port(s) of the plurality of wavelength components is independently changed in accordance with the operation of the switching portion (175-2) corresponding to the switching mode by connecting the output port(s) in the attenuation mode to the input port(s) in the switching mode. Each of the multiple units can independently perform the attenuation and switching functions of the wavelength selective switch.

Figure 10:
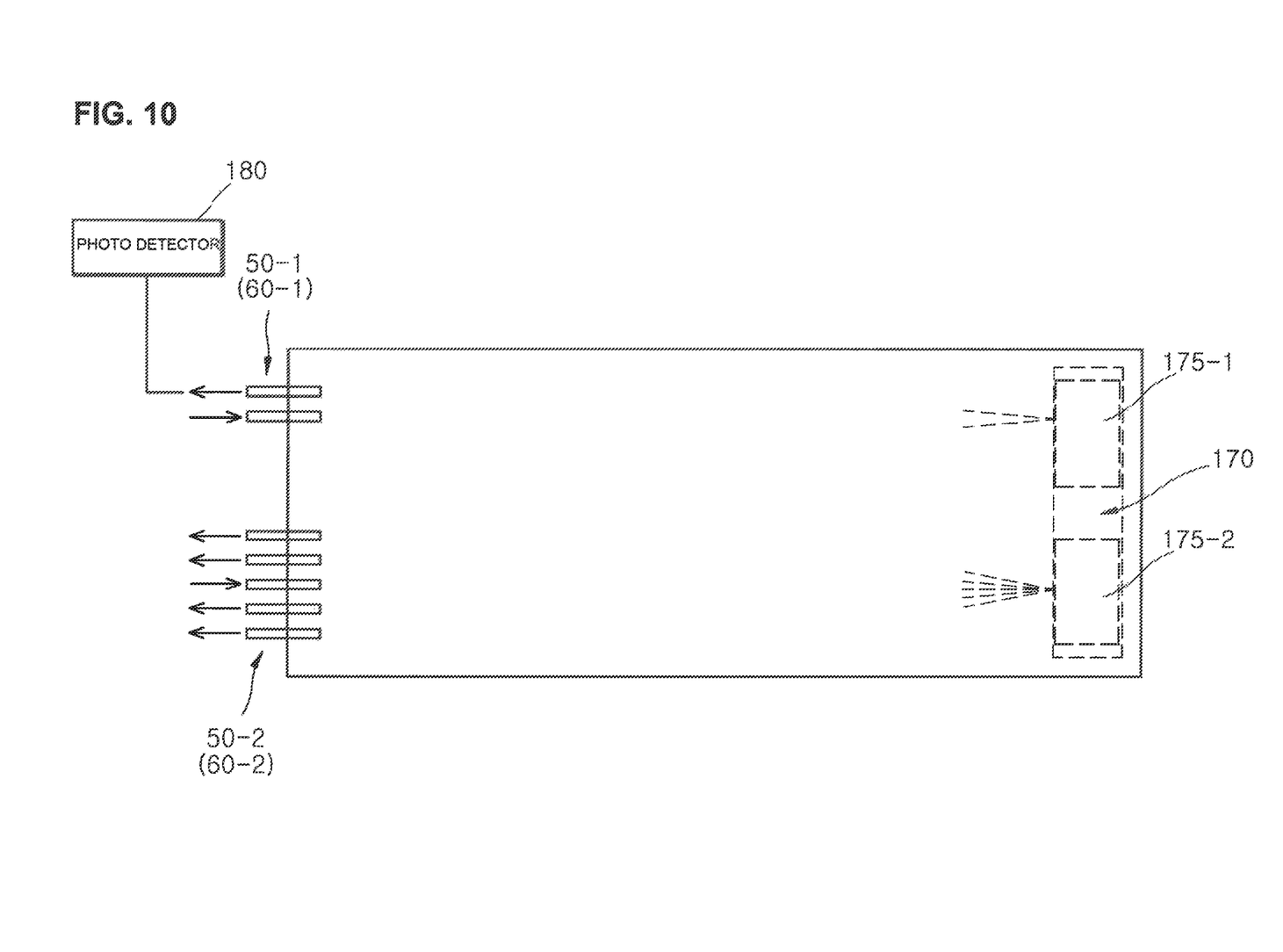
FIG. 10 schematically shows use of a photo detector connected with an input/output port group as an optical output power monitor in a wavelength selective switch for multiple units in accordance with an embodiment of the present invention.

Referring to FIG. 10, an optical power monitor can be constituted by connecting a photo detector (180) to an output port of one input/output port array group (50-1, 60-1) among a plurality of input/output port array groups (50-1, 60-1, 50-2, 60-2). An optical power per channel can be measured by blocking all channels except a particular channel for multiple wavelength components of a light signal input from the corresponding group.

As mentioned above, since the first prism portion (110) and the second prism portion (140) are arranged on the optical path in such a way that they correspond to the plurality of input/output port array groups (50-1, 60-1, 50-2, 60-2), even if assembly deviations of the first prism portion (110) and the second prism portion (140) take place, the focal length of the light beam is not changed. Hence, even if assembly deviations of the first prism portion (110) and the second prism portion (140) take place, it is possible to prevent the degradation of optical performance.

Although a few embodiments of the present invention have been shown and described, it would be appreciated by those skilled in the art that changes may be made in this embodiment without departing from the principles and spirit of the invention, the scope of which is defined in the claims and their equivalents.

INDUSTRIAL APPLICABILITIES

In accordance with the present invention, since the first prism portion and the second prism portion are arranged on the optical path in such a way that they correspond to the plurality of input/output port array groups, even if assembly deviations of the first prism portion and the second prism portion take place, the focal length of the light beam is not changed. Hence, even if assembly deviations of the first prism portion and the second prism portion take place, it is possible to prevent the degradation of optical performance.

What is claimed is:

1. A wavelength selective switch (WSS) for multiple units comprising:
    a plurality of input/output port groups including a plurality of input/output port arrays for transmitting and receiving a plurality of light beams each including a plurality of wavelength channels, wherein each of the plurality of input/output port arrays is a plurality of ports which are arranged one-dimensionally and comprises at least one input port and at least one output port;
    a switching lens portion configured such that the plurality of light beams transmitted from the plurality of input/output port arrays intersect on a switching axis;
    a first prism portion arranged between the plurality of input/output port arrays and the switching lens portion, the first prism portion being configured to refract the plurality of light beams transmitted from the plurality of input/output port arrays at different angles on the switching axis according to different light beam groups, wherein the first prism portion has a plurality of flat surfaces on incident side or exit side, the number of the plurality of flat surfaces being the same as the number of the plurality of input/output port groups, each of the plurality of flat surfaces corresponding to respective one of the plurality of input/output port groups;
    a second prism portion arranged after the switching lens portion, the second prism portion being configured to align a center line of each light beam group transmitted from the switching lens portion in parallel with an optical axis of the second prism portion;
    a beam expansion portion configured for expanding a beam size of each light beam transmitted from the second prism portion in a direction of a dispersion axis;
    a beam splitting portion configured for splitting each light beam whose beam size has been expanded by the beam expansion portion at different angles on the dispersion axis according to different wavelength components;
    an imaging lens portion configured to readjust and focus the wavelengths of the light beams split by the beam splitting portion; and
    a switching portion including a plurality of divided areas corresponding to the plurality of input/output port groups, the switching portion being configured to change an angle of a beam with a selected wavelength on the switching axis such that the wavelength selected from the plurality of wavelength channels of an input port which is selected independently from each group is transmitted to an output port of the plurality of input/output port groups which is selected independently.

2. The WSS for multiple units according to claim 1, further comprising:
    a polarization optical element configured to split the light beams with random polarizations transmitted from the plurality of input/output port arrays into two light beams with substantially the same polarization and arrange the two light beams on the dispersion axis.

3. The WSS for multiple units according to claim 1, wherein a part of the plurality of input/output groups are arranged in an array.

4. The WSS for multiple units according to claim 1, wherein in the plurality of input/output port arrays, a different number of input/output ports is assigned to each input/output port array.

5. The WSS for multiple units according to claim 1, wherein two of the plurality of input/output port arrays are connected in series, one of the two input/output port arrays being used in attenuation mode while the other one of the two input/output port arrays being used in switching mode.

6. The WSS for multiple units according to claim 1, wherein one of the plurality of input/output port arrays are connected to a photo detector to make an optical power monitor.

7. The WSS for multiple units according to claim 1, wherein each of the plurality of input/output port arrays is a plurality of ports which are arranged one-dimensionally and comprises at least one input port and at least three output ports, wherein the beam with the selected wavelength is transmitted to one of the three output ports arranged one-dimensionally.

8. The WSS for multiple units according to claim 1, wherein the second prism portion has a plurality of planar surfaces on incident side or exit side, the number of the plurality of planar surfaces being the same as the number of the plurality of input/output port groups, each of the plurality of planar surfaces corresponding to respective one of the plurality of input/output port groups.

* * * * *